(No Model.)

E. S. WILLIAMS.
SHEAF GATHERER FOR SELF BINDING HARVESTERS.

No. 279,300. Patented June 12, 1883.

Witnesses:

Inventor:
Edwin S. Williams.
By F. F. Warner.
his atty.

UNITED STATES PATENT OFFICE.

EDWIN S. WILLIAMS, OF HOWARD, ASSIGNOR OF ONE-THIRD TO A. VINCENT CLELAND, OF NILES, MICHIGAN.

SHEAF-GATHERER FOR SELF-BINDING HARVESTERS.

SPECIFICATION forming part of Letters Patent No. 279,300, dated June 12, 1883.

Application filed August 5, 1882. (No model.)

*To all whom it may concern:*

Be it known that I, EDWIN S. WILLIAMS, a resident of Howard, county of Cass, and State of Michigan, have invented a certain Improvement in Sheaf-Gatherers for Self-Binding Harvesters, of which the following is a specification.

My invention relates to that class of machines known as "sheaf-gatherers," and the mechanism in which it is embodied is designed to be used on "self-binding harvesters." The object of my invention is to save labor in the gathering of grain after it has been cut and bound for the purpose of shocking in the field. The device is so constructed that a sufficient number of sheaves may be gathered and carried by the machine, when the driver at will may discharge the sheaves in such places as will make it convenient to set them up in shocking.

In order to aid others skilled in the art to which my invention belongs to make and use the same, I will proceed to describe its construction and operations, having reference to the several drawings, forming a part of this specification, in which—

Figure 1:
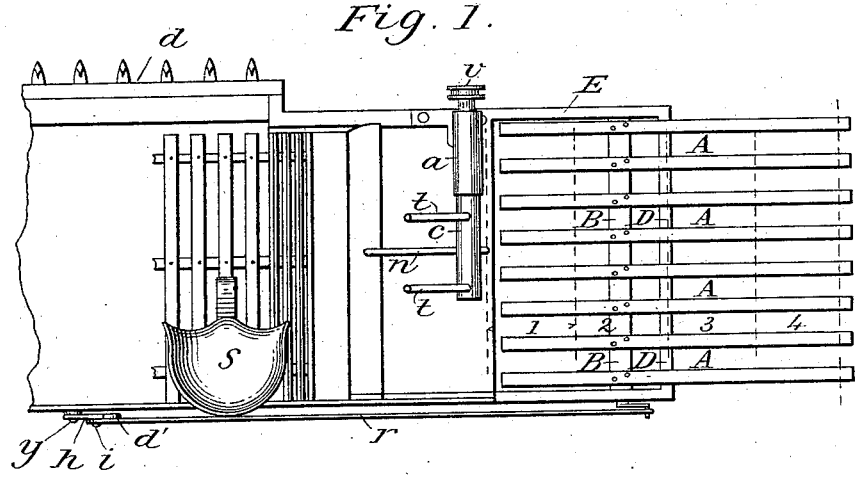
Figure 2:
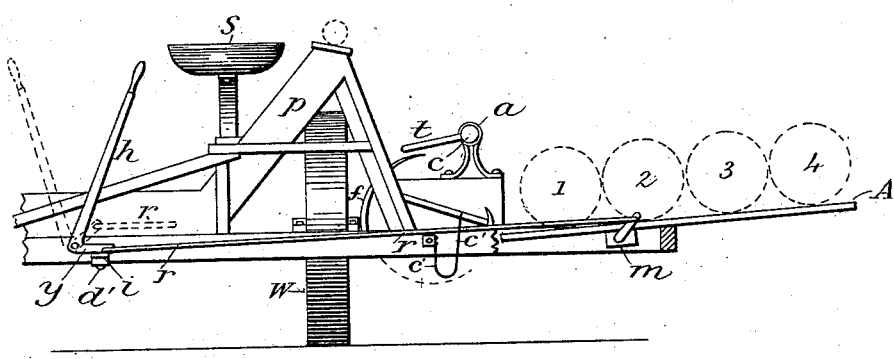
Figure 3:
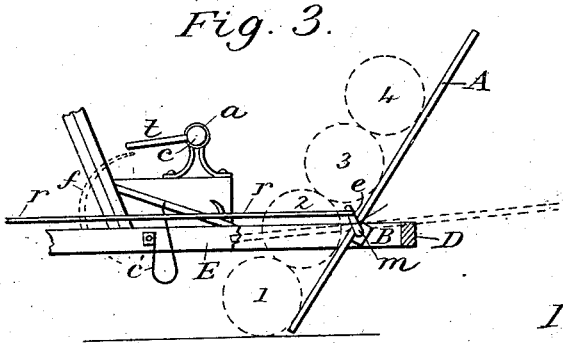

Figure 1 is a top plan view of my machine attached to an ordinary harvester. Fig. 2 is a rear view of the same with elevation, in which dotted circles indicate sheaves of wheat as they are placed by the discharge-arms $t\ t$ of the binder. Fig. 3 is a view of the same as shown in Fig. 2 at the right of the drive-wheel W, and, as in Fig. 2, has a portion of one of the supporting-arms E broken away, showing also the fingers A in the position of discharging the sheaves 1 2 3 4, all of which will be hereinafter described.

To the side of an ordinary harvester I attach two supporting-arms, E E, joining their outer ends by means of the supporting-rest D. Just in front of and parallel with the rest or cross-bar D is a rock-shaft, B, pivoted to the arms E E. Crossing the shaft at right angles is a series of discharge-fingers, A. These fingers are secured to the shaft rigidly, and are parallel with each other, having openings between them. These fingers are so attached to the shaft B that their greater portion extends out over and lies upon the rest D, as shown in Figs. 1 and 2, when the machine is binding sheaves. The fingers are so attached for the following reasons, to wit: First, the distance from the arms E E to the ground will not allow long fingers to be tilted or thrown down to discharge the sheaves, as shown in Fig. 3; second, in order to have the apron-fingers long enough to carry a sufficient number of sheaves, the greater portion extends outward, as specified. I make the fingers long enough to carry four bundles, as shown in the drawings. They may be made longer by extending farther over the rest D, and then tilt, as shown in Fig. 3.

To one end of the shaft B, I attach a crank, $m$, which may be secured in any suitable manner, and so arranged upon the shaft to rock backward and forward in tilting the fingers, in the manner hereinafter described.

Pivoted to the crank $m$ is a connecting-bar, $r$, extending along the side of the machine to near the driver's seat S, so that the driver may operate the bar $r$ by means of the elbowed trip-lever H, which is pivoted to the machine at $y$ and to the bar $r$ at $i$, so that when the driver desires to discharge the sheaves from the fingers A he throws the lever $h$ over to the position indicated by dotted lines, when the bar $r$ will rise, as indicated, and draw forward, rocking the shaft B, tilting the fingers A, and discharging the sheaves, as shown in Fig. 3; and as a means for replacing the fingers A as soon as the sheaves have been discharged, I attach to the side of the harvester an elliptic spring, $c'$, having one end attached to the bar $r$, so that when the fingers A are tilted, as in Fig. 3, the spring will be stiffened or drawn back. The spring is made sufficiently strong to throw the fingers A back to the position shown in Figs. 1 and 2. As soon as the sheaves have dropped off in the act of discharging, as shown in Fig. 3, the spring $c'$, pressing back upon the bar $r$, tilts the fingers back into their normal position, also throwing the lever $h$ back to its former position. The bar $r$ at $i$ is bolted to the right-angle arm of the lever $h$, so that when the spring $c'$ places the fingers down upon the arm D (see Fig. 1) the right-angle portion of the lever $h$, pivoted to the bar $r$, will drop below the pivoted point $y$ and rest upon the fixed stop $d'$, which is secured to the side of the harvester. The pivoted point $i$, being below the point $y$, prevents the fingers A from tilting as soon as the discharge-arms t t of the binder have thrown a bundle or sheaf upon that portion of the finger indicated by the dotted lines 1, the weight thrown upon this portion of the fingers being a direct pressure endwise upon the trip-bar r, which is held from moving endwise by the lower jointed portion, i, resting upon the stop d'.

The slot or opening n in Fig. 1 represents the usual opening through which the needle-arm of the binder works. This arm is lettered f. (See Figs. 2 and 3.)

P represents the usual elevator, over which the grain is carried to the binder.

C represents a shaft of a binder carrying discharge-arms t t, and W represents the main drive-wheel of a harvester.

The sheaves are placed upon the fingers A as follows: As soon as the needle-bar f has bound or tied a sheaf it rocks back, as shown in Fig. 3. The shaft C of the binder then turns, carrying around the discharge-arms t t, thus forcing the sheaf out of the binder upon the fingers A, the first sheaf lying across the fingers in the space indicated by dotted lines 1. (See Figs. 1 and 2.) The second sheaf forces the first out to space 2, and so on, until the desired number of sheaves has been gathered, when they may be discharged, as before stated.

It is obvious the binder in its usual movements places the sheaves upon the fingers A, and by this arrangement of parts I am able to construct a cheap and practical sheaf-gatherer.

Sheaf-gatherers adapted to dump or discharge the sheaves from that end of the gatherer farthest from the binding mechanism have been liable, when tilted, to interfere with the binding mechanism, and also to strike the ground; also, when the machine is moving in badly-tangled grain and the sheaves are bound and pushed out on the tilting table the last one bound is often not perfectly separated from the loose grain in the binder, as the heads are liable to be tangled together; hence the sheaves may not be properly discharged from the gatherer or platform when the latter is tilted for that purpose. It will be perceived, however, that in discharging the sheaves toward the binder the sheaf next thereto receives the weight of the other sheaves to a great extent when the receiver is tilted, and hence the sheaf next to the binder is pushed therefrom, and, being disengaged from the loose grain therein, drops to the ground. The advantage, therefore, of discharging the sheaves toward the binder instead of from it is now apparent. Also, by tilting the sheaf-gatherer on bearings between its center and the end next to the binder the gatherer may be tilted to a steep inclination without striking the ground, thus materially aiding in the discharge of the sheaves, and without interference with the binder.

Having described my invention, what I claim as new, and desire Letters Patent therefor, is—

1. In connection with the binding mechanism of a harvester, a vertically-tilting platform for receiving the sheaves and discharging them, the said platform and its tilting mechanism being adapted for discharging the sheaves toward the binding mechanism and from that end of the said platform which is nearest thereto, substantially as and for the purposes specified.

2. The combination, in a harvester, of the binding mechanism, a vertically-tilting sheaf gatherer and discharger, and a crank and a pitman for tilting up the outer end of the said gatherer, and thereby discharging the sheaves toward the binding mechanism, substantially as and for the purposes specified.

3. The combination, in a harvester, of binding mechanism and a sheaf gatherer and discharger tilting vertically on bearings between the binding mechanism and the transverse center of the gatherer, in connection with means for tilting up the outer end of the gatherer, and thereby discharging the sheaves toward the binding mechanism, substantially as and for the purposes specified.

4. In combination with the cranked tilting shaft, the platform-slats secured thereupon, the shorter ends inside of and the longer ends outside of their points of attachment, the rock-shafts supports E E, the horizontal slat-rest D, outside of the crank-shaft, the mechanism for positively discharging the bundles upon the tilting platform, and the means described by which the short end of the platform is tilted down and the gathered bundles are dumped upon the ground toward the machine, as set forth.

5. In combination with an automatic binder in harvesters, the series of fingers A, secured to the shaft B, having supports E E, cross-rail D, crank m, connecting-bar r, spring c', trip-lever h, pivoted at y and to the connecting-bar at i, and stop d', substantially as shown and described.

EDWIN S. WILLIAMS.

Witnesses:
SCOTT HATTESON,
ROSCOE B. WHEELER.